United States Patent [19]

Trickle

[11] Patent Number: 5,168,267
[45] Date of Patent: Dec. 1, 1992

[54] LOADING DOCK MANAGEMENT SYSTEM EMPLOYING DAISY-CHAINED COMMUNICATIONS MODULES

[75] Inventor: Glen Trickle, Elm Grove, Wis.

[73] Assignee: Rite-Hite Corporation, Milwaukee, Wis.

[21] Appl. No.: 477,599

[22] Filed: Feb. 9, 1990

[51] Int. Cl.⁵ .............................................. G05B 21/00
[52] U.S. Cl. ..................... 340/686; 14/71.1; 340/533; 340/540; 340/687; 340/825.08; 414/401
[58] Field of Search .............. 340/686, 687, 542, 540, 340/533, 524, 825.08, 825.1; 364/401; 14/71.1; 414/401; 280/508, 504; 375/36, 3, 121

[56] References Cited

U.S. PATENT DOCUMENTS

| | | | |
|---|---|---|---|
| 3,537,094 | 10/1970 | Hawkins et al. | 340/545 |
| 3,927,404 | 12/1975 | Cooper | 340/533 |
| 3,969,584 | 7/1976 | Miller et al. | 379/40 |
| 4,127,856 | 11/1978 | Bickel | 340/687 |
| 4,146,779 | 3/1979 | Osborne | 377/20 |
| 4,204,635 | 5/1980 | Hofmann et al. | 235/382 |
| 4,205,300 | 5/1980 | Ho et al. | 340/429 |
| 4,222,047 | 9/1980 | Finnegan | 340/641 |
| 4,264,259 | 5/1981 | Hipp | 414/401 |
| 4,581,605 | 5/1986 | Vogt | 340/525 |
| 4,648,781 | 3/1987 | Sikora | 414/401 |
| 4,692,755 | 9/1987 | Hahn | 340/687 |
| 4,700,295 | 10/1987 | Katsof et al. | 364/401 |
| 4,818,170 | 4/1989 | Fisher et al. | 414/401 |
| 4,830,563 | 5/1989 | Yeakle | 340/687 |
| 4,831,374 | 5/1989 | Masel | 340/825.31 |
| 4,843,373 | 6/1989 | Trickle et al. | 340/540 |
| 4,858,120 | 8/1989 | Samuelson | 364/401 |
| 4,912,687 | 3/1990 | Treeby | 368/10 |
| 5,047,748 | 9/1991 | Trickle | 340/687 |

OTHER PUBLICATIONS

Airline Automation, "AI-based gate management system unveiled by System One:"; *Air Transport World* Nov. 1988, pp. 74 and 79.
United Airlines, "GADS: ES for Airline gate management", *Airweek* Feb. 1, 1988, p. 5.
Carole A. Shifrin/Dallas, "Gate Assignment Expert System Reduces Delays at United's Hubs", Air Transport, *Aviation Week & Space Technology* Jan. 25, 1988, pp. 143 and 149.

*Primary Examiner*—Glen R. Swann, III
*Attorney, Agent, or Firm*—Leydig, Voit & Mayer

[57] ABSTRACT

A management system includes a daisy chain arrangement for serial transfer of dock status data from one module to another of a group of monitoring modules and to a master control box, each module being located at a dock of a multi-dock facility. The master control box periodically receives dock status data from one or more groups of modules, determines whether any change of status has occurred and transmits data to a central processing unit.

16 Claims, 3 Drawing Sheets

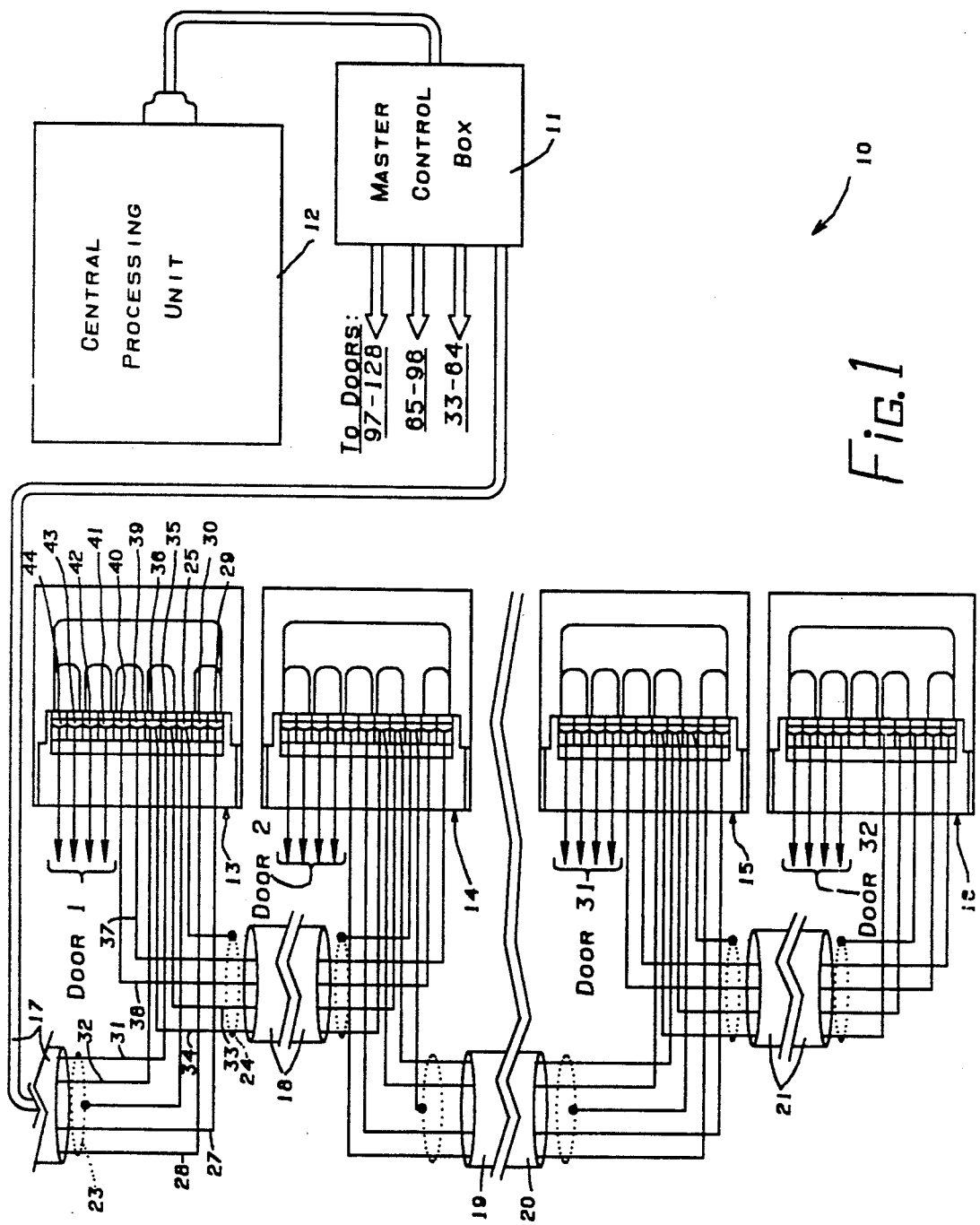

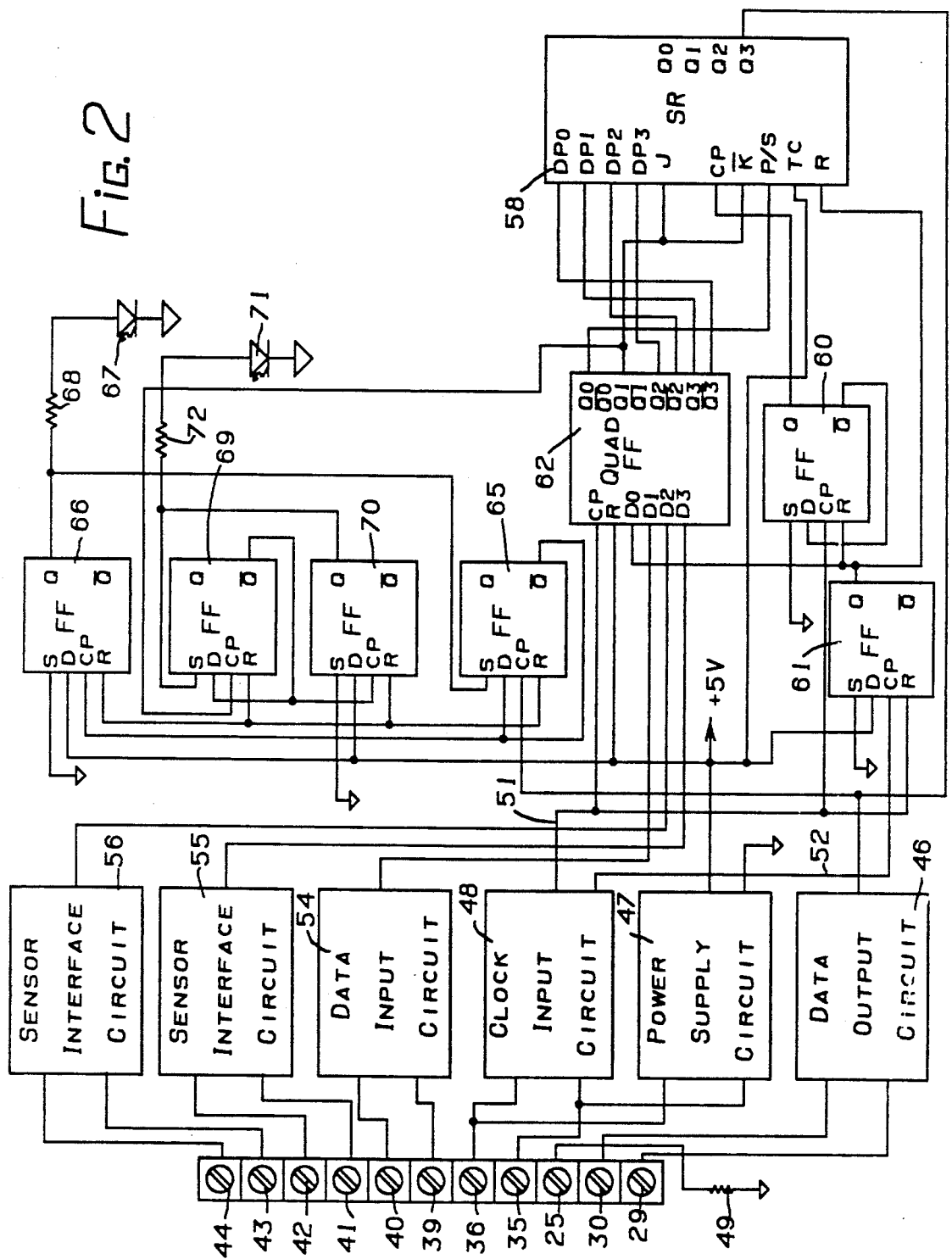

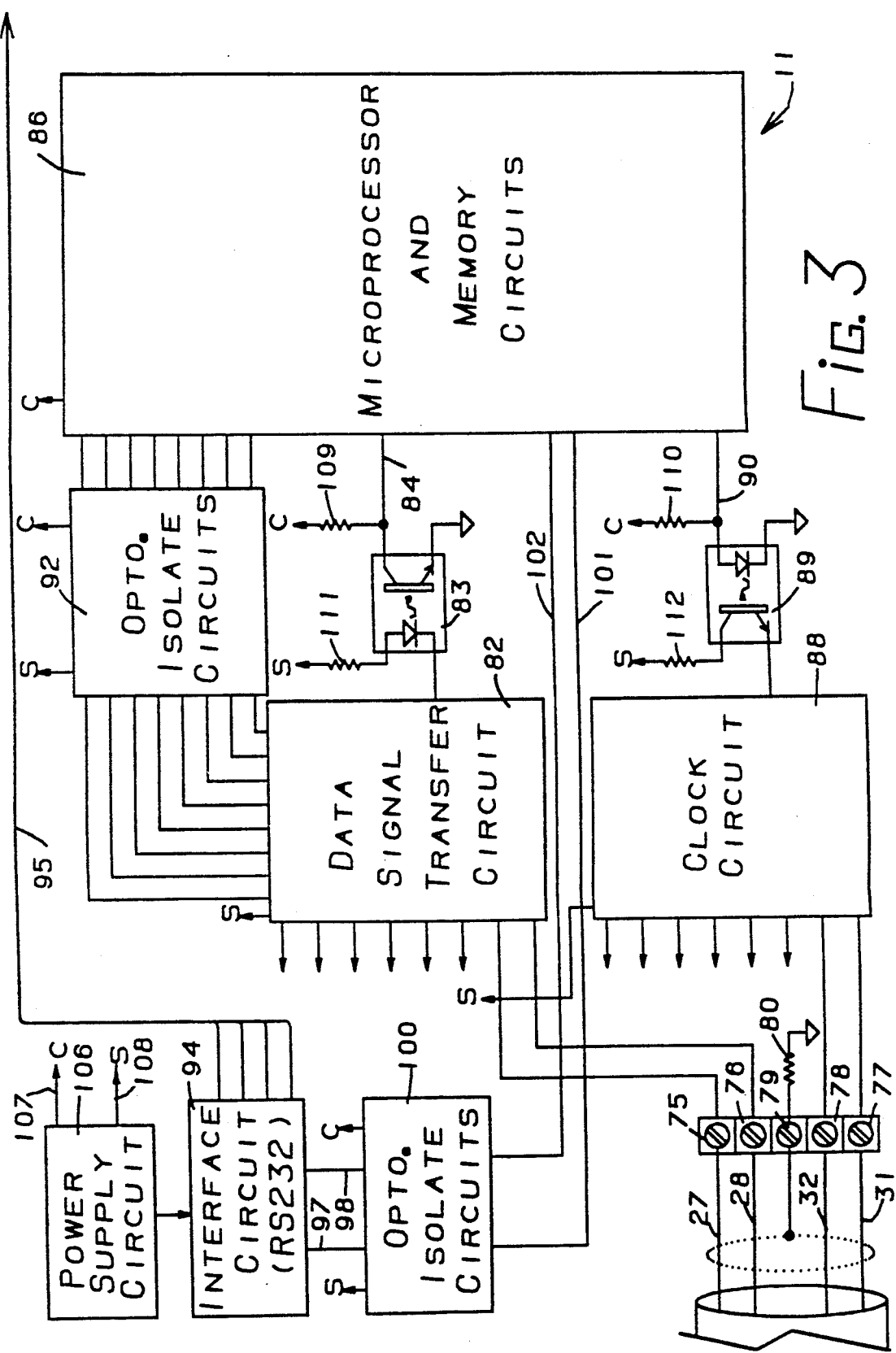

LOADING DOCK MANAGEMENT SYSTEM EMPLOYING DAISY-CHAINED COMMUNICATIONS MODULES

REFERENCE TO RELATED APPLICATION

This application is related to my prior application Ser. No. 341,531 filed Apr. 21, 1989, now U.S. Pat. No. 5,047,748 entitled "DOCK MONITORING SYSTEM", the disclosure thereof being incorporated herein by reference.

BACKGROUND OF THE INVENTION

1. Field of the Invention

This invention relates to a dock monitoring system and more particularly to improvements relating to transmission and processing of data in a monitoring system such as used for monitoring operations at a truck docking facility to obtain improved safety and traffic control and to facilitate scheduling and planning. The invention facilitates installation of equipment, provides increased reliability and minimizes manufacturing and other expenses.

2. Background of the Prior Art

As disclosed in my aforementioned prior application, systems have heretofore been provided for controlling operations and indicating operations at truck docking facilities. The Hahn U.S. Pat. No. 4,692,755 discloses a system in which signal lights are provided on the inside and outside of a dock facility to give dock personnel and truck drivers clearly visible indications of when it is safe or unsafe to load or unload a truck or to park or remove a truck, and to provide other safety features. An improvement of the system of the Hahn Patent is disclosed in the Trickle et al. U.S. Pat. No. 4,843,373 issued Jun. 27, 1989. The system of the Trickle et al. patent includes a programmable control unit which is versatile and provides various safe and reliable modes of operation, being also operable to perform diagnostic operations. These systems have produced increased safety and efficiency in loading and unloading operations with the result that problems and the possibilities for other improvements have not been recognized.

In my aforesaid prior patent, a system is disclosed which resulted in part from a discovery and recognition of problems with existing systems, particularly with respect to safety and efficiency problems which occur in many systems, especially in systems in which there are a large number of truck loading/unloading positions. A monitoring system is provided for installation at a multi-position docking facility which includes a locking device at each position for restraining a truck against movement during loading/unloading operations. The system is relatively inexpensive but permits a controller or dispatcher at a multi-position truck docking facility to easily and instantaneously obtain information as to the current status of the locking device at each truck unloading position and, in addition, to obtain information as to the length of time that each operated lock device has been in its locked condition.

Information from each loading position on the dock is received from sensing devices located in each position. Each time a change occurs in the status of any one of the positions, the change is recorded so that over time a picture of the comings and goings as a whole is built up. Such information is usable on a day to day basis and is also accumulated over longer periods.

The system of my aforesaid prior application has other important advantages and features which are disclosed in detail therein. A data processor is used which is preferably a standard type of personal computer and associated keyboard and monitor available commercially at relatively low cost. The data processor is operable by a keyboard and is adapted to receive signals placed in each of the loading/unloading positions of a loading dock facility. The sensors coupled to the data processor include lock condition sensing means for developing locked and unlocked signals respectively corresponding to the locked and unlocked condition of a truck in the at each of the positions.

The data processor is operable to continually process signals from the lock condition sensing means and includes a display screen to enable a plurality of types of data to be displayed. The types of data available include the current lock condition data which shows the current status of each of the lock conditioning means and the load time data showing the time of development of each locked signal and the data processor may also be coupled to truck sensing means for developing empty and in-door signals corresponding to the existence or otherwise of a truck in each of the loading/unloading positions.

SUMMARY OF THE INVENTION

This invention was evolved with the general object of improving upon the system of my prior patent, particularly with respect to facilitating installation of a system and obtaining improved performance and reliability, while reducing manufacturing and operational expenses.

In accordance with the invention, a management system is provided which includes a daisy chain arrangement for serial transfer of dock status data from one module to another of a group of monitoring modules and to a central processing unit. The arrangement greatly reduces problems in installation and also greatly reduces the number of required isolation interfaces and other components, as well as in the number of wires in interconnecting cables.

Important features relate to the provision of a master control box which periodically receives dock status data from one or more groups of modules and stores such information for subsequent transfer to the central processing unit or a display unit. In one mode of operation, it determines whether any change of status has occurred and transmits data to a central processing unit.

Further features of the invention relate to the achievement of a very high degree of reliability and to features relating to isolation of signals and protection against excess voltages, transients and interfering fields.

This invention contemplates other objects, features and advantages which will become more fully apparent from the following detailed description taken in conjunction with the accompanying drawings.

BRIEF DESCRIPTION OF THE DRAWINGS

FIG. 1 is a schematic diagram of a management system for a multi-dock facility, constructed in accordance with the invention;

FIG. 2 is a circuit diagram of a monitoring module of the system of FIG. 1; and

FIG. 3 is a schematic diagram of a master control box of the system of FIG. 1.

DESCRIPTION OF A PREFERRED EMBODIMENT

Reference numeral 10 generally designates a management system which is constructed in accordance with the principles of this invention, the illustrated system being arranged for monitoring conditions at docks of a multi-position dock facility. The system is particularly advantageous in facilities in which there are a large number of docks and, as illustrated, is usable to monitor conditions at up to 128 truck loading/unloading positions or "doors", a door being typically provided at each position. It will be understood that the invention is not limited to monitoring conditions at any particular number of positions or doors. Typically, a vehicle restraining or locking device is provided at each door, arranged to engage a standard type of bumper which includes a transverse horizontal bar at the rear of a truck or trailer, required by I.C.C. regulations and commonly referred to as a "ICC" bar. A vehicle restraint sensor may be provided for sensing whether the restraining device is in a locked or unlocked position and truck sensor may also be provided for sensing whether or not a truck or trailer is positioned at loading/unloading position. The truck sensor may be in the form of an overhead photoelectric sensor, for example.

In the illustrated system, the conditions of such vehicle restraint and truck sensors are monitored using a monitoring module at each door with all monitoring modules being connected through a master control box 11 to a central processor unit 12. As is disclosed in my aforesaid prior patent the central processor unit 12 may preferably include a standard type of personal computer such as an IBM PC or compatible, connected to a keyboard and monitor and including disc drives for storage of information. Among other advantages, a permanent record may be obtained as to activities at all doors for review as desired, and a dispatcher may readily and quickly obtain information as to the status of conditions at each door for efficient control of traffic at the facility.

As indicated in FIG. 1, the modules are divided into four groups of 32 each, a first group for door #'s 1–32, a second group for door #'s 33–64, a third group for door #'s 65–96 and a fourth group for door #'s 97–128. Modules for door #'s 1, 2, 31 and 32 of the first are shown in FIG. 1 and are designated by reference numerals 13, 14, 15 and 16. In accordance with the invention, the modules are connected together and to the master control box 11 in daisy chain fashion. As shown diagrammatically, the module 13 for door #1 is connected through a cable 17 to the master control box 11 and through a cable 18 to the module 14 for door #2, module 14 being connected through a cable 19 to a module, not shown for door #3. Module 15 for door #31 is connected through a cable 20 to a module, not shown, for door #30 and through a cable 21 to module 16 which is for door #32.

Each of the cables 17–21 has two pairs of conductors which provide two signal transmission channels, one for transmission of data signals and the other for transmission of signals which serve both to supply power to circuits of the modules and to perform control and clock or timing functions. The conductors of each pair conduct signals in balanced relation to ground and are surrounded by a protective conductive shield as shown, and/or by an external conduit, connected at opposite ends to ground or shield terminals to minimize interferences of electromagnetic origin. Installation is simple and is readily accomplished. For example, shields 23 and 24 of cables 17 and 18 are connected to a shield terminal 25 of module 13. Conductors 27 and 28 of cable 17 are connected to a pair of "data out" terminals 29 and 30 of module 13; conductors 31 and 32 of cable 17 and conductors 33 and 34 of cable 18 are connected to a pair of "power/clock" terminals 35 and 36 of module 13; and conductors 37 and 38 of cable 18 are connected to "data in" terminals 39 and 40 of module 13.

The only additional required connections for module 13 are connections from terminals 41 and 42 to a vehicle restraint sensor of door #1 and connections from terminals 43 and 44 to a truck sensor for door #1. The connections for the other modules are same as for module 13 with the exception of the end module 16 in which there are no connections to "data in" terminals thereof. All modules have connections through cable conductors from "data out" terminals thereof to "data in" terminals of a preceding module or, in the case of the first module 13, to terminals of master control box. All modules have connections through cable conductors to "power/clock" terminals thereof. The modules do not require any connection to any voltage supply source, other than those provided through the cables FIG. 2 is a schematic diagram of circuitry for the module 13 which is the same as for all other modules. As shown, the shield terminal 25 is connected through a resistor 49 to a circuit ground and the "data out" terminals 29 and 30 are connected to a data output circuit 46.

The "power/clock" terminals 35 and 36 are connected to a power supply circuit 47 and also to a clock input circuit 48. A 2 KHz square wave voltage developed by the master control box 11 and applied to the terminals 35 and 36 is converted by the power supply circuit to a +5 volt DC voltage to supply an operating voltage to circuits of the module. The 2 KHz voltage is also processed by the clock input circuit 48 to develop clock signals on lines 51 and 52, the signal on line 52 being in delayed relation to the signal on line 51.

The "data in" terminals 39 and 40 are connected to a data input circuit 54 while the vehicle restraint sensor terminals 41 and 42 and the truck sensor terminals 43 and 44 are connected to sensor interface circuits 55 and 56.

Each of the circuits 46–48 and 54–56 includes voltage limiting and transient protection means with excess current protection. The sensor interface circuits can accept voltages within a very wide range of values.

A four stage integrated circuit shift register 58 is provided which has a Q3 output connected to an input of the data output circuit 46. A CP input is connected to a Q output of a clocking flip-flop 60 which has a D input connected to an inverted Q output thereof and which has a CP input connected to the clock signal line 51. Reset inputs of the shift register 58 and the flip-flop 60 are connected to a Q output of a reset flip-flop 61 which has reset and CP inputs connected to the clock signal lines 51 and 52. When clock signals are applied, the reset flip-flop is initially reset to reset the clocking flip-flop 60 and the shift-register 58. The reset flip-flop is then triggered to a set condition by a delayed clock signal applied through line 52 and the clocking flip-flop is thereafter triggered by clock signals applied through line 51 to apply clock signals to the shift register 58.

As also shown, the four stage shift register 58 has additional inputs connected to outputs of four flip-flops in a quad flip-flop integrated circuit 62. In particular, a P/S input is connected to a Q0 output of a first flip-flop of circuit 62, J and K inputs are connected together and to a Q1 output of a second flip-flop of circuit 62, and inputs DP0, DP1, DP2 and DP3 are respectively connected to outputs of third and fourth flip-flops of the circuit 62. A D0 input to the first flip-flop of circuit 62 is connected to the Q output of the reset flip-flop 61, a D1 input to the second flip-flop is connected to the data input circuit 54 and D2 and D3 inputs of the third and fourth flip-flops are connected to outputs of the sensor interface circuits 56 and 55, respectively.

In operation, the first flip-flop of circuit 62 operates to effect a parallel load of sensor signals stored in the third and fourth flip-flops into stages of the shift register. The second flip-flop of circuit 62 is thereafter operative to effect a serial transfer of data signals into the J and K inputs of the shift register 58 to be shifted through the stages of the shift register 58 in response to clock signals applied thereto.

The result is that a serial train of signals is developed at the Q3 output of the last stage of the shift register 58 to be applied through the output circuit 46 to the master control box 11, the first two being door #1 state signals from the two interface circuits 55 and 56 and the following signals being signals applied through the data input circuit 54. Such following signals are applied from the output of the second module 14 which is operated in synchronism with the module 13, the first two of the following signals being the door #2 sensor state signal, the next two thereafter being the door #3 sensor state signals, and so on. Thus a serial train of sixty four signals is developed and applied to the master control box 11 corresponding to the states of the 64 sensors at doors #'s 1–32.

To check operation of the module 13, flip-flop 65 has a CP input connected to the Q3 output of the shift register 58 and is connected to a flip-flop 66 as shown having a Q output connected through a resistor 68 to energize a "data out" LED 67 in response to output signals. Similarly, a flip flop 69 has a CP input connected to the Q1 output of the second flip flop of the circuit 62 and is connected to a flip flop 70 which has a Q output connected through a resistor 72 to energize a "data in" LED 71 in response to input signals.

FIG. 3 is a schematic diagram of circuitry of the master control box 11. A pair of terminals 75 and 76 are provided which are connected through the conductors 27 and 28 of the cable 17 to the "data out" terminals 29 and 30 of the module 13. Another pair of terminals 77 and 78 are provided which are connected through conductors 31 and 32 of the cable 17 to "power/clock" terminals 35 and 36 of the module 13. A shield terminal 79 is connected to the shield of cable 17 and through a resistor 80 to ground.

The terminals 75 and 76 are connected to a data signal transfer circuit 82 which has an output connected through an opto isolator circuit 83 to a line 84 which is connected to microprocessor and memory circuits 86. The terminals 77 and 78 are connected to outputs of a clock circuit 88 which is arranged to supply 2 Khz signals thereto and which is controlled through an opto isolator circuit 89 and a line 90 from the microprocessor and memory circuits 86. The data signal transfer circuit 82 and the clock circuit 88 are also connected to other groups of modules as indicated by the arrows in FIG. 3.

It is also noted that the data signal transfer circuit 82 is connected through opto isolate circuits 92 to input/output ports of the microprocessor and memory circuits 86 for the purpose of having the capability of transmitting data signals to modules as well as having the capability of passively receiving data signals from the modules. In the operation of the system as described herein, only the passive mode of operation is used but it will be understood that the same principles of operation may be used for transmitting data to the modules.

An interface circuit 94, which may preferably generate signals in accordance with the RS 232 standard, has an output coupled through a four conductor cable 95 to the central processing unit 12, one of the conductors being a shield conductor, another being a clear-to-send-/data-set-ready conductor and the other two being RX and TX conductors. RX and TX inputs of the interface circuit 94 are connected through lines 97 and 98, opto isolate circuits 100 and RX and TX lines 101 and 102 of the microprocessor and memory circuits. In addition to or instead of transmitting data to the illustrated central processing unit 12, data may be transmitted from the master control box 11 to a display or other data receiving unit. Either serial or parallel communications may be used in each case and standards other than the RS 232 standard such as the RS485 and RS422 standards may be used.

A power supply circuit 106 is provided which supplies voltages for operation of the interface circuit 94 and which also develops supply voltages on lines 107 and 108 which are isolated from one another and which may be +5 volts, for example. The voltage on line 107, labelled "C" is applied to the microprocessor and memory circuits, through resistors 109 and 110 to the lines 84 and 90 on the microprocessor side of the opto isolators 83 and 89.

The voltage on line 108, labelled "S" is applied to the data signal transfer circuit 82, the clock circuit 88, the opto isolate circuits 92, and through resistors 111 and 112 to the portions of the opto isolators 83 and 89 which are required to be isolated from the microprocessor and memory circuits 86.

The clock circuit 88 is preferably arranged to develop differential signals which are preferably at a voltage of on the order of +24 volts in accordance with RS485 standards and which are 2 Khz pulses used for both applying an operating voltage to each of the modules and also for performing clock and timing functions. The clock circuit 88 is so controlled from the microprocessor of the microprocessor and memory circuits 86 as to be periodically inoperative for a 50 millisecond reset period in which no clock pulses are generated and to then generate a train of 256 clock pulses at 0.25 millisecond intervals, being operative back to a reset condition after 256 counts.

During generation and application of a train of 256 pulses to a group of 32 modules, the line 84 is monitored by the microprocessor to receive the train of data transmitted from the modules 13 and the other modules of the group of 32, operating in effect to observe data at every 4th edge to receive a train of 64 data bits. Such bits are stored along the 64 bits received from each of the other three groups of 32 modules each. A total of 256 bits are available from a total of 128 possible modules. It is noted that the system may accommodate any lesser number of modules, no modifications being necessary. If there are less than 32 modules in any group, there will simply be no reported data for the absent modules.

In a polling mode of operation, the central processing unit 12 can keep asking for information from the master control box 11. In an interrupt mode of operation, the central processing unit may receive information whenever there is a change in the data stream of bits received by the master control box 11. In the memory circuits of the microprocessor and memory circuits 86, the bits from each received series of bits are stored for comparison with the bits received in the next operation and the system may operate to automatically initiate communication to the central processing unit when such a change is detected. The system may also incorporate suitable operations using check sums to verify the accuracy of the received information.

It will be understood that modifications and variations may be effected without departing from the spirit and scope of the novel concepts of this invention.

I claim:

1. A monitoring system for a dock facility having a plurality of positions and including sensing means for monitoring the state of conditions at each position, said monitoring system comprising: a module for each position arranged for receiving state condition signals from sensing means thereat, master control means, and means for coupling said modules to provide a chain of modules arranged for serial transfer of data to said master control means.

2. A monitoring system as defined in claim 1, wherein all except the first and last modules of said chain are arranged to transmit data to a next preceding module and to receive data from a next subsequent module and wherein said first module is arranged to receive data from a next preceding module and transmit data to said master control means.

3. A monitoring system as defined in claim 2, wherein said master control means includes means for generating a clock signal to be applied to all of said modules for synchronized operation thereof to transfer data serially from one module to another.

4. A data transfer module, comprising: terminal means for coupling to interconnecting cables to interconnect said data transfer module in a chain of like modules and including data input terminal means for receiving data signals, data output terminal means for transmitting data signals and clock signal terminal means for receiving a train of clock pulses, shift register means having a plurality of stages including an input stage and an output stage, means coupled to said input terminal means for applying received data signals to said input stage of said shift register means, means coupled to said output terminal means for applying data signals from said output stage of said shift register means to said data output terminal means, and means for applying said train of clock pulses to said shift register stages to shift received data signals through said stages and from said output stage to said output terminal means.

5. A module as defined in claim 4, further including a data receiver, and means operative in timed relation to application of said train of clock pulses for effecting a parallel transfer of data signals between said data receiver and at least one of said shift register stages.

6. A module as defined in claim 5, wherein said parallel transfer of data signals is effected from said data receiver to said shift register to be output from said output stage in advance of data signals received from said input terminal means.

7. A module as defined in claim 6, further including terminal means coupled to said data receiver and arranged for coupling to external sensor means to receive data representing the state of said external sensor means.

8. A management system including a master control means which includes means for periodically generating trains of clock pulses, and a plurality of data transfer modules each including terminal means for coupling to interconnecting cables to interconnect said data transfer module in a chain of like modules and to said master control means and including data input terminal means for receiving data signals from one adjacent module of said chain, data output terminal means for transmitting data signals to a second adjacent module of said chain, and clock signal terminal means for receiving trains of clock pulses from said master control means, shift register means having a plurality of stages including an input stage and an output stage, means coupled to said input terminal means for applying received data signals to said input stage of said shift register means, means coupled to said output terminal means for applying data signals from said output stage of said shift register means to said data output terminal means, and means for applying said train of clock pulses to said shift register stages to shift received data signals through said stages and from said output stage to said output terminal means.

9. A management system as defined in claim 8, wherein each module further includes a data receiver, and means operative in timed relation to application of said train of clock pulses for effecting a parallel transfer of data signals between said data receiver and at least one of said stages of said shift register of said module.

10. A management system as defined in claim 9, wherein said parallel transfer of data signals is effected from said data receiver to said shift register to be output from said output stage in advance of data signals received from said input terminal means.

11. A management system as defined in claim 10, wherein each module further includes terminal means coupled to said data receiver thereof and arranged for coupling to external sensor means to receive data representing the state of said external sensor means.

12. A management system as defined in claim 8, wherein each module includes power supply means energized from said trains of clock pulses for providing a voltage supply for operation of circuitry of said module including said shift register means.

13. A management system as defined in claim 8, said master control means being arranged for coupling to and operation of a plurality of chains of said modules.

14. A management system as defined in claim 8, said master control means including processor and memory means for temporary storage of data, and means for transmitting data to a central processor unit.

15. A management system as defined in claim 8 wherein said master control means is operable in a polling mode to transmit data to data receiving means upon request.

16. A management system as defined in claim 8 wherein said master control means is operable in an interrupt mode to transmit data to data receiving means whenever there is a change in data received by said master control means from modules coupled thereto.

* * * * *